Aug. 10, 1937.    J. F. KIRBY    2,089,802
PIPE COUPLING
Filed June 15, 1934
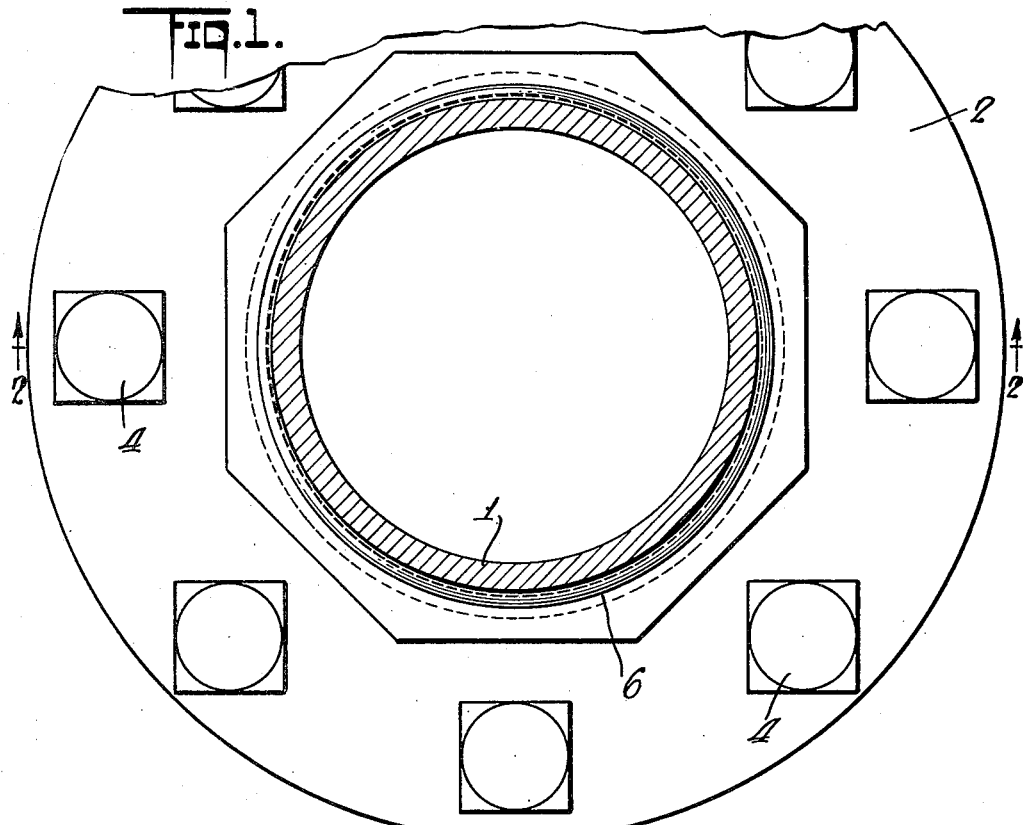
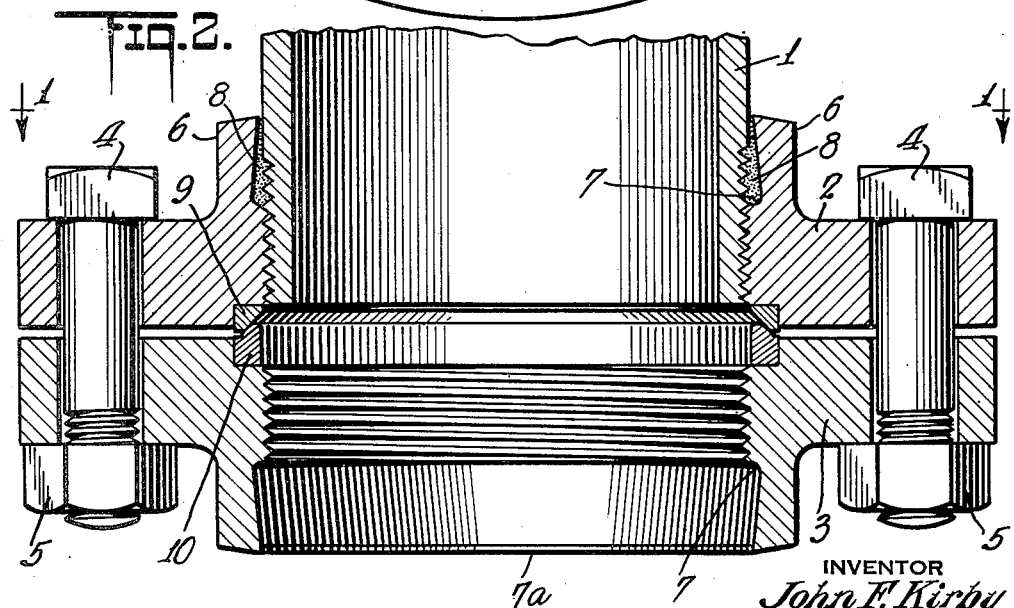
INVENTOR
John F. Kirby
BY
George O. [signature]
ATTORNEY Patented Aug. 10, 1937

2,089,802

UNITED STATES PATENT OFFICE 2,089,802

PIPE COUPLING

John F. Kirby, Somerville, N. J., assignor, by mesne assignments, to Reconstruction Finance Corporation, a corporation Application June 15, 1934, Serial No. 730,742

2 Claims. (Cl. 285—138)

My present invention relates to pipe couplings and the main object of the invention is to provide an effective seal for the joint between adjacent ends of pipe sections, particularly where the sections are clamped end to end by longitudinal bolts.

The invention is of particular importance as applied to couplings for large diameter cast iron pipes having ends formed or provided with coupling flanges which are clamped together by the bolts. The coupling flanges may be integral with the pipes, but, preferably, they are separate collars screwed on the ends of the pipe sections. This method of coupling is commonly employed in conduits for steam or other fluid under pressure, and it is difficult to provide packing that will properly seal the joint, particularly where the diameter is great and the pipes are of cast iron.

My present invention relates more particularly to a solution of the problem of packing of the joint between the confronting faces of the flanges. It is common to employ packing gaskets between these faces, but in the case of heavy, large-diameter pipes, it would be extremely difficult, and in practice is seldom possible, to position the pipes precisely enough to make the flanges bear evenly on the packing. On the other hand, it is practically impossible to correct slight misalignment, by merely screwing down the nuts on the bolts, because the length and weight of the pipe is too great to permit angular movement of the pipes into alignment under any stresses that can be safely applied through the bolts. So, in practice, screwing down the nuts enough to apply uniform high tension through the bolts, does not result in uniform clamping of the gasket, but only in setting up dangerous strains, the presence of which cannot be detected. In this respect, the situation is radically different from that of an ordinary flat packing gasket used for sealing a joint between the cylinder and the head of an explosive motor, where the head offers no resistance to angular adjustment into exact uniform bearing on the packing, in response to uniform pressure applied by uniform screwing down the nuts on the stud bolts.

My present invention solves this problem by providing engaging surfaces so shaped as to provide a connection in the nature of an imperfect ball and socket joint. That is to say, the engaging surfaces are shaped so that they have line contact all the way around, only when the packing rings are parallel and concentric. If not parallel, even though concentric, they will give only two points of contact.

Preferably, the engaging sealing surfaces are on annular members, in the form of washers or sealing rings, seated in annular recesses surrounding the inner ends of the pipe sections. One of the sealing rings is provided with an external, outwardly presented, curved, tapered surface, adapted to wedge outwardly while the other is provided with a cooperating inwardly presented, flaring surface adapted to wedge inwardly against said rounded tapered surface of the other ring even when the pipe sections are at a slight angle. Such inwardly presented surfaces may flare along diverging straight lines, like a cone; or along similar symmetrically disposed curved lines, provided the curvature be greater than that of the outwardly presented curved, tapered surface.

The material and proportions of the sealing rings or washers are such that the contact surfaces will be somewhat yieldable under the powerful pressure exerted by the coupling bolts, as explained below.

The above and other features of my invention may be more fully understood from the following description in connection with the accompanying drawing, in which Fig. 1 is a section taken along the line 1—1, of Fig. 2; and Fig. 2 is a section taken along the line 2—2 of Fig. 1.

In the illustrative embodiment of the invention, as shown in the drawing, a pipe 1 of suitable material, such as cast iron, is provided at one end with coupling means, preferably in the form of a coupling or flange 2 adapted for connection with a cooperating coupling flange 3, on another pipe, by suitable clamping means such as bolts 4, passing through aligned bolt holes in the two flanges, and nuts 5 screwed down on said bolts.

The coupling flanges may be integral with the pipe, but as shown in the drawing, they are detachably connected therewith by a die-cut taper screw-thread and each flange is provided with a hub or collar, the inner surface of which is abruptly enlarged as at 7, to expose a portion of the pipe thread; and then tapers inward toward the outer surface of the pipe 1, to a distance substantially beyond the pipe thread; the distance and the taper being such that the surface or edge 7a slidingly fits the exterior of pipe 1, thus forming an outboard bearing surface or fulcrum to sustain tilting stresses which would otherwise take effect solely on the relatively short end of the pipe, where it is weakened by the screw threading. The thin annular cavity may be filled with packing or sealing material, such as plumber's cement. The hub or collar portion 6 has an octagonal exterior shape and may be used in screwing the flange on the pipe.

The present invention aims more particularly at the provision of sealing means between the face flanges, whether screwed on or made integral with the pipe, said means including a packing ring 9 seated in a suitable annular recess in the flange coupling member 2, and a registering packing ring 10 seated in a corresponding annular recess in the opposite coupling member 3, the rings being of such material and shape as to produce effective sealing.

As shown, the ring 9 is formed with a flaring internal engaging surface such as a frustoconical surface adapted to wedge inwardly, and with an endwise presented annular stop surface approximately parallel with the plane of the flange; and the packing ring 10 is provided with an external engaging surface having a rounded taper, adapted to be wedged inwardly by said flaring inward surface of ring 9. The rounded taper is sharply curved, being of small radial dimensions but curving steeply in to a surface that approximates that of an outwardly presented cylinder; and terminates abruptly, at the base, in an annular stop surface confronting and in cooperative relation to the end stop surface of ring 9. When thus formed, the surfaces are primarily adapted for line contact only when the rings are coaxial and parallel. The packing rings are relatively massive and are preferably made of metal such as brass, which, though fairly tough and rigid, is much less brittle than cast iron or steel, and will be malleably deformable and resiliently yieldable under the powerful inwardly wedging pressure exerted when the coupling bolts are tightened to such slight extent as may be necessary to ensure a definite surface of sealing contact, as distinguished from a mere line contact. The definite surface sealing contact may shift and widen if the bolts are sufficiently tightened, but the possible movement will be limited by contact of the annular stop surface on the tip of ring 9 engaging the parallel stop surface at the base of the rounded externally presented surface of ring 10.

It should be noted that while the outward pressure on the packing ring 9 is transmitted directly to the flange 2, the inward pressure on the packing ring 10 is sustained by the ring itself. Therefore, as indicated in the drawing, it is desirable to have the packing ring 10 of heavier cross-section than the packing ring 9.

It should be understood that the coupling of the present invention provides an effective seal even when the fluids passing therethrough are gases, such as steam, at relatively high pressures.

It will be noted that the sealing rings project beyond the faces of the flanges so far that in practice, said flange faces do not contact; also that the projecting rings are located far inside of the bolts, so that in the operation of tightening the bolts, the bearing surfaces act as fulcrums for the minute angular movements, when the bolts are successively tensioned. Consequently, the angular stresses applied to and through the flanges are much greater than when ordinary flat gaskets are used between the flange faces. The flanges with integral collars can be made of metal such as steel, which is tougher than the cast iron of the pipes. The interior of the collar portion, can be solidly united to the pipe by having its machined taper threads fitting the pipe thread for a certain distance, then enlarged to expose a rear portion of the pipe thread and forming a relatively thin tapered recess terminating in the outboard bearing edge 7a.

As a result, the angular stresses applied to the collar by tightening the bolts against the projecting ring fulcra, are distributed throughout a substantial length of the end of the cast iron pipe, and the tough steel collar and the frangible cast iron pipe resist the strains better than they would if an attempt had been made to cast them integral.

Various changes may be made in the construction and arrangement of parts and certain features may be used without others without departing from the true spirit and scope of the invention.

I claim:

1. A coupling for cast iron pipes having taper threaded ends, including coupling flanges having confronting faces; secured together by longitudinal bolts; and sealed by interfitting rings inset in and projecting beyond the faces of the opposite flanges near the inner marginal peripheries thereof; each flange having an integral collar portion, the interior of which has taper screw threads fitting a portion of the pipe thread near the end of the pipe; then abruptly enlarged to expose a rear portion of said pipe thread; then tapering inward, longitudinally of the pipe, to a distance substantially beyond the pipe thread, the distance and rate of taper being such that the rear end of said collar slidingly fits the exterior cylindrical surface of the pipe, thus forming an outboard bearing surface to apply angular stresses from the flanges on pipe surface remote from the end of the pipe.

2. In a pipe coupling of the type including two hard metal coupling flanges having confronting faces with central openings having annular recesses around each of them, together with longitudinal tightening bolts arranged at intervals around the flanges, and, in combination with said parts, interfitting sealing rings seated in the respective recesses, the contact surface of one of said rings being an internal, inwardly wedging surface that flares symmetrically outward with respect to the axis of the ring and has an endwise presented stop surface approximately parallel with the plane of the flange; and the cooperating contact surface of the other ring being outwardly presented for such inward wedging, and flaring symmetrically outward along lines of much sharper curvature than the inward wedging surface of the other ring, so that until deformed by such wedging, it can have all-around line contact with the inwardly presented surfaces of said other ring, only when said rings are concentric and in axial alignment, and said outwardly-presented, sharp-curvature surface being formed at the base with a stop surface confronting and in cooperative relation to the endwise presented stop surface of the other ring; and both said rings being made of metal that is malleably deformable and resiliently yieldable, so that when said bolts are tightened sufficiently, the contacting metal of both rings will be deformed enough to make surface contact entirely around the central openings, even when said rings are not exactly concentric and in exact axial alignment.

JOHN F. KIRBY.